(12) United States Patent
Jungnickel et al.

(10) Patent No.: US 11,021,157 B2
(45) Date of Patent: Jun. 1, 2021

(54) CONTROLLER FOR A MOTOR VEHICLE, MOTOR VEHICLE, AND METHOD FOR CONTROLLING A MOTOR VEHICLE

(71) Applicant: VOLKSWAGEN AKTIENGESELLSCHAFT, Wolfsburg (DE)

(72) Inventors: Christian Jungnickel, Ribbesbüttel (DE); Jens Wodausch, Braunschweig (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 71 days.

(21) Appl. No.: 16/471,108

(22) PCT Filed: Dec. 11, 2017

(86) PCT No.: PCT/EP2017/082115
§ 371 (c)(1),
(2) Date: Jun. 19, 2019

(87) PCT Pub. No.: WO2018/114407
PCT Pub. Date: Jun. 28, 2018

(65) Prior Publication Data
US 2019/0329775 A1    Oct. 31, 2019

(30) Foreign Application Priority Data

Dec. 19, 2016  (DE) ..................... 10 2016 225 421.9

(51) Int. Cl.
*B60W 10/06* (2006.01)
*B60W 10/10* (2012.01)
(Continued)

(52) U.S. Cl.
CPC ........ *B60W 30/1843* (2013.01); *B60W 10/06* (2013.01); *B60W 10/11* (2013.01);
(Continued)

(58) Field of Classification Search
CPC .. B60W 10/06; B60W 10/10; B60W 30/1843; B60W 50/14; B60W 2510/0676;
(Continued)

(56) References Cited

U.S. PATENT DOCUMENTS 6,466,854 B1   10/2002   Henneken et al.
6,632,157 B1   10/2003   Gierling et al.
(Continued)

FOREIGN PATENT DOCUMENTS

DE   198 44 618 A1   3/2000
DE   198 49 058 A1   4/2000
(Continued)

OTHER PUBLICATIONS

International Search Report of PCT Application No. PCT/EP2017/082115, dated Mar. 29, 2018.

*Primary Examiner* — Edwin A Young
(74) *Attorney, Agent, or Firm* — Pearl Cohen Zedek Latzer Baratz LLP

(57) ABSTRACT

A controller for a motor vehicle (1) has an internal combustion engine (3), a transmission (4), and a cooling device (5) with a coolant (5b) for cooling the internal combustion engine (3), wherein the controller (2) is configured to determine a target minimum rotational speed for the internal combustion engine (3) on the basis of the temperature of the internal combustion engine (3) and/or the temperature of the coolant (5b) and to determine a target gear setting on the basis of the target minimum rotational speed.

17 Claims, 2 Drawing Sheets

(51) Int. Cl.
*B60W 30/184* (2012.01)
*B60W 10/11* (2012.01)
*F01P 11/16* (2006.01)
*B60R 16/023* (2006.01)
*B60W 50/14* (2020.01)

(52) U.S. Cl.
CPC ........... *F01P 11/16* (2013.01); *B60R 16/0231* (2013.01); *B60W 50/14* (2013.01); *B60W 2050/146* (2013.01); *B60W 2510/0638* (2013.01); *B60W 2510/0676* (2013.01); *B60W 2510/1005* (2013.01); *B60W 2552/15* (2020.02); *B60W 2710/0644* (2013.01); *B60W 2710/0688* (2013.01); *B60W 2710/1005* (2013.01); *F01P 2025/66* (2013.01); *F01P 2031/20* (2013.01); *F01P 2050/22* (2013.01)

(58) Field of Classification Search
CPC . B60W 2510/0638; B60W 2710/0644; B60W 2710/0688; B60W 2710/1005; F01D 11/06
See application file for complete search history.

(56) References Cited

U.S. PATENT DOCUMENTS

| | | | |
|---|---|---|---|
| 8,321,101 B2 * | 11/2012 | Thomas | B60W 10/11 701/54 |
| 2003/0094150 A1 * | 5/2003 | Romblom | F01L 1/34 123/90.17 |
| 2006/0155452 A1 | 7/2006 | Strenkert | |
| 2007/0144464 A1 | 6/2007 | Muller | |
| 2011/0295451 A1 | 12/2011 | Fassnacht | |
| 2014/0149006 A1 | 5/2014 | Eriksson et al. | |
| 2014/0214289 A1 | 7/2014 | Ott et al. | |
| 2015/0088392 A1 * | 3/2015 | Yu | F16H 63/42 701/58 |
| 2016/0003355 A1 * | 1/2016 | Nishida | F02D 41/023 477/107 |
| 2016/0016466 A1 * | 1/2016 | Turner | B60W 10/11 180/233 |
| 2016/0082951 A1 * | 3/2016 | Ohn | B60W 10/30 701/22 |
| 2016/0186856 A1 * | 6/2016 | Sahlberg | F16H 59/64 701/55 |

FOREIGN PATENT DOCUMENTS

| | | |
|---|---|---|
| DE | 10155459 A1 | 5/2002 |
| DE | 10 2004 002 761 A1 | 8/2005 |
| DE | 10 2004 029 680 A1 | 12/2005 |
| DE | 102005062294 A1 | 6/2007 |
| DE | 102008054699 A1 | 6/2010 |

* cited by examiner

CONTROLLER FOR A MOTOR VEHICLE, MOTOR VEHICLE, AND METHOD FOR CONTROLLING A MOTOR VEHICLE

CROSS-REFERENCE TO RELATED APPLICATIONS

This application is a National Phase Application of PCT International Application No. PCT/EP2017/082115, International Filing Date Dec. 11, 2017, claiming priority of German Patent Application No. 10 2016 225 421.9, filed Dec. 19, 2016, which is hereby incorporated by reference.

FIELD OF THE INVENTION

The invention relates to a controller for a motor vehicle, to a motor vehicle having such a controller, and to a method for controlling a motor vehicle, especially in the realm of motor and transmission control.

BACKGROUND OF THE INVENTION

In general, it is a known procedure to control the drive train of a motor vehicle, whereby the drive train can have, among other things, an internal combustion engine and a transmission.

German Preliminary Published Application DE 10 2004 002 761 A1 discloses a method for operating a drive train of a motor vehicle, whereby the drive train has a drive machine, a transmission and a control device. The control device limits the torque of the drive machine in order to protect the transmission. For this purpose, the control device evaluates information about the temperature of the transmission and limits the torque as a function of the temperature information.

A method for reducing the thermal loading of an automatic transmission for a motor vehicle in case of emergency is known from German Preliminary Published Application DE 198 44 618 A1. The thermal loading of the automatic transmission is reduced in that a permissible maximum engine torque is prescribed for emergency driving operation.

The cited documents from the state of the art have the drawback that they only take into account the state of the automatic transmission.

In a motor vehicle that has an internal combustion engine and an automatic transmission, however, it is also known that, for example, during mountainous driving, the transmission control unit prescribes the highest gear, which can mean that the internal combustion engine has to deliver its maximum torque. This can cause a high thermal loading of the cooling system of the internal combustion engine. In an extreme case, the temperature of the coolant of the cooling system can rise to such an extent that emergency measures are taken such as, for example, shutting down the air-conditioning, reducing the torque delivered by the internal combustion engine, actuating a warning light indicating that the temperature of the internal combustion engine is too high, or the like.

SUMMARY OF THE INVENTION

The objective of the present invention is to put forward a controller for a motor vehicle that has an internal combustion engine, a transmission and a cooling device, to put forward a motor vehicle having such a controller, and to put forward a method for controlling a motor vehicle that has an internal combustion engine, a transmission and a cooling device, said controller at least partially overcoming the above-mentioned drawbacks.

This objective is achieved by the controller of the invention according to claim 1, by the motor vehicle according to claim 9 and by the method according to claim 10.

According to a first aspect, the present invention puts forward a controller for a motor vehicle, whereby the motor vehicle has an internal combustion engine, a transmission and a cooling device with a coolant in order to cool the internal combustion engine, and whereby the controller is configured to:

determine a target minimum rotational speed for the internal combustion engine on the basis of the temperature of the internal combustion engine and/or on the basis of the temperature of the coolant; and determine a target gear setting on the basis of the target minimum rotational speed.

According to a second aspect, the present invention puts forward a motor vehicle that has an internal combustion engine, a transmission, a cooling device with a coolant in order to cool the internal combustion engine, and a controller according to the first aspect.

According to a third aspect, the present invention puts forward a method for controlling a motor vehicle that has an internal combustion engine, a transmission and a cooling device with a coolant in order to cool the internal combustion engine, whereby the method comprises:

determining a target minimum rotational speed for the internal combustion engine on the basis of the temperature of the internal combustion engine and/or on the basis of the temperature of the coolant; and determining a target gear setting on the basis of the target minimum rotational speed.

Additional advantageous aspects of the invention ensue from the subordinate claims and from the description below of preferred embodiments of the present invention.

As mentioned above, for example, in a motor vehicle that has an internal combustion engine and an automatic transmission, it is known that, during mountainous driving, the transmission control unit prescribes the highest gear, which can mean that the internal combustion engine has to deliver its maximum torque, which entails all of the other above-mentioned consequences.

In order to solve this problem, one could visualize adjusting the shifting characteristic map in the transmission control unit. However, this could cause the internal combustion engine to be operated at a higher rotational speed. Selecting a lower gear typically causes an increase in the volumetric flow in the internal combustion engine. Due to the mechanically coupled cooling water pump, the water volumetric flow in the cooling system is directly proportional to the rotational speed of the engine. At the same time, the reduced load demand at the same output can lead to a lower energy input into the cooling system.

Consequently, with this visualized solution, however, no dynamic intervention would be possible in case of an elevated temperature, since the downshifting points in the transmission are typically specified during the development phase. If the motor vehicle or the internal combustion engine is overloaded by a user, the prescribed temperature limits might be exceeded. Another increase in the rotational speed or a downshifting would no longer occur since the downshifting points were specified during the development phase.

The emergency cascade specified in such a visualized solution, which, as mentioned above, can comprise, for example, shutting down the air-conditioning, a heat warning light and torque reduction, involves defined steps that are checked in the motor vehicle in conjunction with the permissible total weight and permissible towing capacity. However, such an emergency cascade has perceptible drawbacks such as the lack of air-conditioning and diminished driving performance.

Consequently, as also mentioned above, some embodiments relate to a controller for a motor vehicle that has an internal combustion engine, a transmission and a cooling device with a coolant in order to cool the internal combustion engine. The controller is configured to determine a target minimum rotational speed for the internal combustion engine on the basis of the temperature of the internal combustion engine and/or on the basis of the temperature of the coolant, and to determine a target gear setting on the basis of the target minimum rotational speed.

The controller can have typical elements of a motor vehicle controller such as one or more processors, a memory, logic circuit elements, etc.

The internal combustion engine can be a gasoline engine, a diesel engine or the like, and the present invention is not restricted to a specific type of internal combustion engine.

The transmission can be a manual, a semi-automatic or a fully automatic transmission of the types fundamentally known to the person skilled in the art.

The cooling device can have an (air) cooler in which the coolant is cooled. The coolant can be water-based as is generally the case.

The target minimum rotational speed can fundamentally be selected as a function of the specifications of a concrete internal combustion engine and of a concrete cooling device. Here, the dependence of the target minimum rotational speed on the temperature of the internal combustion engine or on the temperature of the coolant can have been specified in advance. This dependence can be configured as a threshold value so that, for example, if a threshold value for the temperature of the internal combustion engine or for the temperature of the coolant is exceeded, then a prescribed target minimum rotational speed is determined. However, the dependence can also relate to a prescribed function and can be, for instance, linear, exponential or the like, so that, for example, when the temperature rises, the target minimum rotational speed also rises. In this context, the dependence can be stored in the form of a table in the controller, for example, in the memory, or as a formula, so that the target minimum rotational speed is determined as needed on the basis of the formula, that is to say, it is calculated in this case.

A target gear setting is determined on the basis of the target minimum rotational speed. The target gear setting is not the same as the one that leads to the target minimum rotational speed in every embodiment, but rather the target gear setting can be selected in such a way that the momentary rotational speed of the internal combustion engine changes in the direction of the target minimum rotational speed.

The invention entails the advantage that the driving comfort and the availability of the interior air-conditioning can be improved, especially as compared to the above-mentioned visualized solution, since, for example, the cited emergency cascade is not used, and consequently the air-conditioning system does not have to be shut down. Moreover, the thermal loading of the internal combustion engine and for auxiliary components can be reduced. Furthermore, the application resources in the transmission or in the controller (gear controller) can be reduced. Some embodiments allow an as-needed rotational speed specification for the engine in order to minimize the thermal load and to maximize the customer comfort.

As already mentioned, the transmission can be configured as an automatic transmission and the controller can also be configured to control the transmission on the basis of the determined target gear setting. As a result, the gear setting can be automatically changed in accordance with the target gear setting.

The transmission can also be configured as a manual transmission and the controller can also be configured to issue a gear recommendation on the basis of the determined target gear setting. In this manner, a user can be told to select another gear that brings about a change from the momentary rotational speed of the internal combustion engine to the target minimum rotational speed.

The target minimum rotational speed can be determined in order to minimize the thermal loading of the internal combustion engine. Here, for example, the thermal load can be determined in advance as a function of the internal combustion engine. This means that the relationship between the rotational speed and the thermal loading of the internal combustion engine can be known in the case of some embodiments. Accordingly, the target minimum rotational speed can be determined in such a way that the thermal load is minimized to a prescribed or predetermined extent. Consequently, the thermal load can be systematically controlled and influenced.

The target minimum rotational speed can be determined if the temperature of the internal combustion engine exceeds a temperature threshold value and/or if the temperature of the coolant exceeds a temperature threshold value. As a result, the target minimum rotational speed can be determined as a function of the temperature threshold so that the controller only intervenes in this case.

The controller can have an engine control section and a transmission control section, whereby the engine control section determines the target minimum rotational speed and the transmission control section determines the target gear setting. This makes it possible to arrange the engine control section and the transmission control section at a distance from each other or else to provide the appertaining function in control units that are already present such as, for example, the engine control unit and the transmission control unit.

The motor vehicle can also have a data bus such as a CAN bus, Flex bus or the like, and the engine control section can transmit the target minimum rotational speed to the transmission control section via the data bus. In this manner, the determined target minimum rotational speed information can be transmitted to the transmission control section that then determines the target gear setting on this basis.

The determination of the target minimum rotational speed can be carried out incrementally. This makes it possible to lower the temperature of the internal combustion engine or of the coolant in stages. For example, first of all, the next-lower gear with the associated target minimum rotational speed can be selected. If it turns out, for instance, that the temperature of the internal combustion engine or of the coolant is still above a temperature threshold value, then the next-lower gear with the associated target minimum rotational speed can be determined, etc. As a result, an incremental control of the temperature of the internal combustion engine or of the coolant is possible and larger shifting increments in the transmission can be avoided.

Some embodiments relate to a motor vehicle as described above that has an internal combustion engine, a transmission, a cooling device with a coolant in order to cool the internal combustion engine, and a controller as described herein.

Some embodiments relate to a method for controlling a motor vehicle, as described herein, that has a transmission, an internal combustion engine, and a cooling device with a coolant in order to cool the internal combustion engine. The method comprises the steps that were also already described above in conjunction with the controller, namely, determining a target minimum rotational speed for the internal combustion engine on the basis of the temperature of the internal combustion engine and/or on the basis of the temperature of the coolant, and determining a target gear setting on the basis of the target minimum rotational speed.

The method can be carried out, for example, by the controller described herein.

As explained, the transmission can be configured as an automatic transmission and the method can also comprise controlling the transmission on the basis of the determined target gear setting. The transmission can be configured as a manual transmission and the method can also comprise issuing a gear recommendation on the basis of the determined target gear setting. The target minimum rotational speed can be determined in order to minimize the thermal loading of the internal combustion engine. As mentioned, the target minimum rotational speed can be determined if the temperature of the internal combustion engine exceeds a temperature threshold value and/or if the temperature of the coolant exceeds a temperature threshold value.

BRIEF DESCRIPTION OF THE DRAWINGS

Embodiments of the invention will now be described by way of example and making reference to the accompanying drawing, in which.

DETAILED DESCRIPTION OF THE INVENTION

Figure 1:
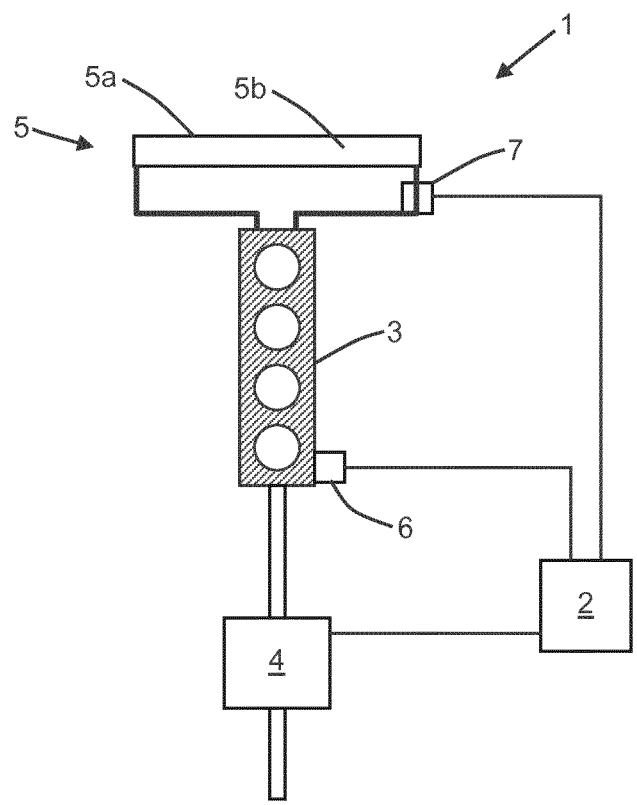
FIG. 1 schematically shows an embodiment of a motor vehicle with a controller, FIG. 2 schematically shows the controller for the motor vehicle with the actuated components.

An embodiment of a motor vehicle 1 with a controller 2 is schematically shown in FIG. 1.

The motor vehicle 2 has an internal combustion engine 3. The internal combustion engine 3 is configured as a 4-cylinder gasoline engine, but without the invention being restricted in this respect.

The internal combustion engine 3 is coupled via a drive shaft to a transmission 4, whereby the transmission 4 is configured as an automatic transmission, for example, as a conventional dual-clutch transmission.

Moreover, a cooling device 5 is provided that cools the internal combustion engine 3 by means of a cooler 5a that is filled with a coolant 5b in a generally known manner.

In order to determine the temperature of the internal combustion engine 3, there is a temperature sensor that measures the oil temperature and thus the temperature of the internal combustion engine 3.

In order to determine the temperature of the coolant 5b, there is another temperature sensor 7 in the coolant circuit of the cooling device 5.

In the embodiment shown in FIG. 1, the controller 2 is coupled to the internal combustion engine 3, to the transmission 4, to the temperature sensor 6 and to the temperature sensor 7.

Figure 2:
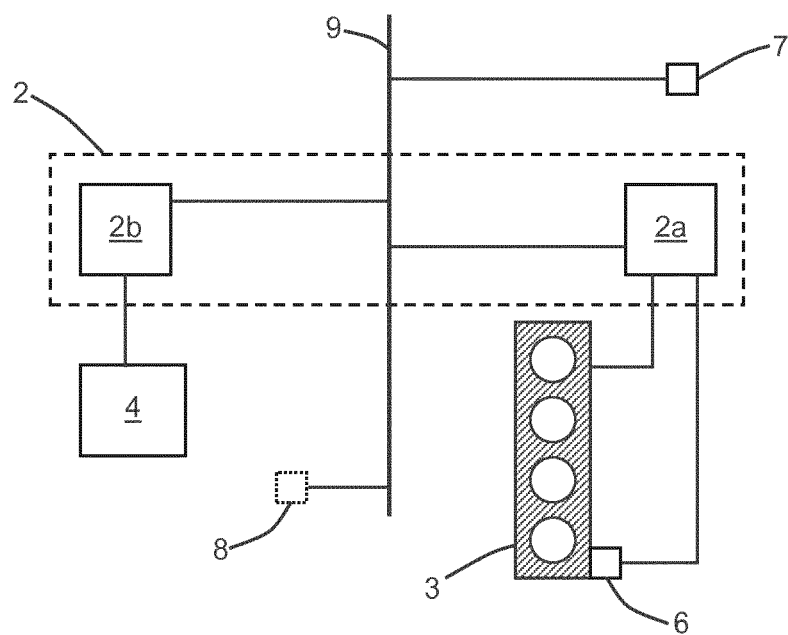

FIG. 2 shows another embodiment in which the controller 2 is made up of an engine control section 2a (e.g. engine control unit) and a transmission control section 2b (e.g. transmission control unit) that can communicate with each other via a CAN bus 9.

In the embodiment shown in FIG. 2, the temperature sensor 7 is coupled to the CAN bus 9 and it transmits temperature values to the engine control section 2a via said CAN bus 9.

The engine control section 2a is coupled directly to the internal combustion engine 3 and to the associated temperature sensor 6.

The transmission control section 2b is coupled directly to the transmission 4.

Moreover, a shifting recommendation display 8 can optionally be issued, as will also be explained below.

Figure 3:
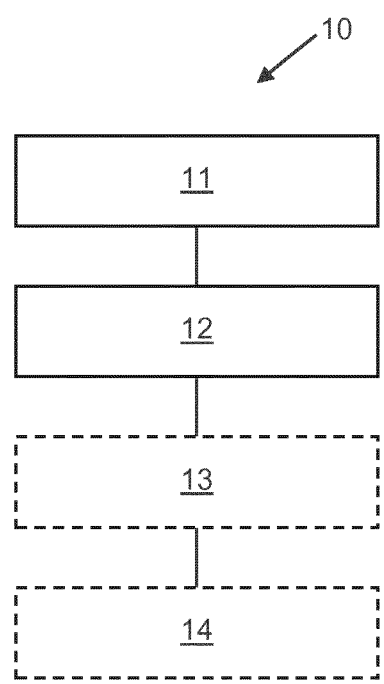
FIG. 3 shows a flow chart of a method for controlling the motor vehicle depicted in FIG. 1.

Below, the mode of operation of the controller 2 and of the control sections 2a and 2b will be explained with reference to the flow chart shown in FIG. 3, which depicts the sequence of a method 10 for controlling the motor vehicle 1 of FIG. 1.

In step 11, the method 10 first determines the target minimum rotational speed for the internal combustion engine 3 on the basis of the temperature of the internal combustion engine 3 and/or on the basis of the temperature of the coolant 5b. For this purpose, the engine control section 2a receives the appertaining temperature values from the temperature sensor 6, which determines the temperature of the internal combustion engine 3, and/or the engine control section 2a receives the appertaining temperature values from the temperature sensor 7, which determines the temperature of the coolant 5b.

As already indicated above and explained in greater detail below, there are embodiments in which the target minimum rotational speed is determined only on the basis of the temperature of the coolant 5b or on the basis of the temperature of the internal combustion engine 3. In such embodiments, the superfluous temperature sensor can be dispensed with. For instance, in embodiments that make use of the temperature of the coolant 5b, the temperature sensor 6 can be left out, and in embodiments that make use of the temperature of the internal combustion engine 3, the temperature sensor 7 can be left out.

The engine control section 2a determines, as already mentioned, an appertaining target minimum rotational speed on the basis of the temperature. This target minimum rotational speed is about 4000 rpm, for example, above a coolant temperature of 115° C., whereby the temperature of 115° C. is set as the temperature threshold value, without the invention being restricted to this concrete example.

In embodiments in which the target minimum rotational speed is determined on the basis of the temperature of the internal combustion engine 3, the temperature threshold value can be set, for example, at 110° C. and, on this basis, a target minimum rotational speed of about 4000 rpm can be determined, without the invention being restricted to this concrete example.

In step 12, the controller 2 determines a target gear setting. This can be done in that the engine control section 2a provides the minimum rotational speed and/or issues a shifting recommendation that, for example, actively prevents the transmission 4 from up-shifting, so that an operating point at a high rotational speed and at a low load is established. Consequently, the cooling system, as explained above, is thermally relieved and the emergency cascade does not have to be activated, so that there are no adverse effects for the customer in terms of the interior air-conditioning or the drivability.

However, the engine control section 2a can also transmit the target minimum rotational speed, for example, in that it activates an already present message on the drive-CAN 9, for instance, ENGINE_Prio_MIN_target_rotational_speed, in order to indicate to the transmission 4 or to the transmission control section 2b that a target minimum rotational speed has to be set.

In response to the CAN message ENGINE_MIN_target_rotational_speed that is already present, the target minimum rotational speed determined or needed by the engine control section 2a is sent, and then received by the transmission control section 2b and processed.

Therefore, if the momentary rotational speed of the internal combustion engine 3 is below the target minimum rotational speed that the engine control section 2a has determined, then, in step 13, the transmission 4 downshifts by appropriately controlling the transmission control section 2b to such an extent that the target minimum rotational speed is maintained.

As an alternative, in some embodiments, the rotational speed specification can be cascaded as a function of the temperature of the internal combustion engine 3 so that the engine control section 2a raises the target minimum rotational speed incrementally. If, for example, the downshifting by one gear is not sufficient to increase the cooling output, then another speed increase of the target minimum rotational speed can be effectuated, as a result of which steps 11 and 12 are repeated, for instance, in a loop. Assuming a constant output, which is necessary, the cooling mass flow rises and the required torque drops once again.

In some embodiments, the transmission 4 is configured as a manual transmission.

In such embodiments, for instance, the controller 2 can determine the target minimum rotational speed in step 11 and the target gear setting in step 12, as was explained above. Then in step 14, as an alternative to step 13, the controller 2 can issue a shifting recommendation and can control the shifting recommendation display 8 accordingly, so that an appropriate shifting recommendation is displayed to the user of the motor vehicle 1.

LIST OF REFERENCE NUMERALS 1 motor vehicle
2 controller
2a engine controller
2b transmission controller
3 internal combustion engine
4 transmission
5 cooling device
5a cooler
5b coolant
6 temperature sensor for 4
7 temperature sensor for 5b
8 shifting recommendation display
9 CAN bus
10 method for controlling 1
11 determining the target minimum rotational speed
12 determining the target gear setting
13 controlling the transmission
14 issuing the shifting recommendation

The invention claimed is:

1. A controller for a motor vehicle that has an internal combustion engine, a transmission and a cooling device with a coolant in order to cool the internal combustion engine, whereby the controller is configured to, until a temperature of the internal combustion engine or the coolant has been lowered to a predetermined amount, iteratively:
   determine a target minimum rotational speed for the internal combustion engine on the basis of the temperature of the internal combustion engine or the coolant;
   determine a target gear setting that will change a current rotational speed of the internal combustion engine in the direction of the target minimum rotational speed; and
   shift to the target gear setting, or issue a gear recommendation on the basis of the determined target gear setting.

2. The controller according to claim 1, whereby the transmission is configured as an automatic transmission and the controller is configured to control the transmission on the basis of the determined target gear setting.

3. The controller according to claim 1, whereby the transmission is configured as a manual transmission and the controller is configured to issue a gear recommendation on the basis of the determined target gear setting.

4. The controller according to claim 1, whereby the target minimum rotational speed is determined in order to minimize the thermal loading of the internal combustion engine.

5. The controller according to claim 1, whereby the target minimum rotational speed is determined if the temperature of the internal combustion engine exceeds a temperature threshold value and/or if the temperature of the coolant exceeds a temperature threshold value.

6. The controller according to claim 1, whereby the controller has an engine control section and a transmission control section, whereby the engine control section determines the target minimum rotational speed and the transmission control section determines the target gear setting.

7. The controller according to claim 6, whereby the motor vehicle has a data bus, and whereby the engine control section transmits the target minimum rotational speed to the transmission control section via the data bus.

8. The controller according to claim 1, whereby the determination of the target minimum rotational speed is carried out incrementally.

9. The controller according to claim 1, wherein, for at least one iteration, the controller is further configured to determine at least a first target gear setting and a second target gear setting, the first target gear setting will increase the current rotational speed but not enough to meet the target minimum rotational speed determined for the iteration, and the second target gear setting will increase the current rotational speed to at least the target minimum rotational speed for the iteration.

10. A motor vehicle comprising:
   an internal combustion engine,
   a transmission,
   a cooling device with a coolant in order to cool the internal combustion engine, and
   a controller configured to, until a temperature of the internal combustion engine or the coolant has been lowered to a predetermined amount, iteratively:
      determine a target minimum rotational speed for the internal combustion engine on the basis of the temperature of the internal combustion engine or the coolant, determine a target gear setting that will change a current rotational speed of the internal combustion engine in the direction of the target minimum rotational speed, and shift to the target gear setting, or issue a gear recommendation on the basis of the determined target gear setting.

11. A method for controlling a motor vehicle that has an internal combustion engine, a transmission and a cooling device with a coolant in order to cool the internal combustion engine, whereby the method comprises:

until a temperature of the internal combustion engine or the coolant has been lowered to a predetermined amount, iteratively:

determining a target minimum rotational speed for the internal combustion engine on the basis of the temperature of the internal combustion engine or the coolant;

determining a target gear setting that will change a current rotational speed of the internal combustion engine in the direction of the target minimum rotational speed; and shifting to the target gear setting, or issuing a gear recommendation on the basis of the determined target gear setting.

12. The method according to claim 11, whereby the transmission is configured as an automatic transmission and the method further comprises controlling the transmission on the basis of the determined target gear setting.

13. The method according to claim 11, whereby the transmission is configured as a manual transmission and the method further comprises issuing a gear recommendation on the basis of the determined target gear setting.

14. The method according to claim 11, whereby the target minimum rotational speed is determined in order to minimize the thermal loading of the internal combustion engine.

15. The method according to claim 11, whereby the target minimum rotational speed is determined if the temperature of the internal combustion engine exceeds a temperature threshold value and/or if the temperature of the coolant exceeds a temperature threshold value.

16. The method according to claim 11, whereby the determination of the target minimum rotational speed is carried out incrementally.

17. The method according to claim 11, wherein, for at least one iteration, determining the target gear setting comprises determining at least a first target gear setting and a second target gear setting, wherein the first target gear setting will increase the current rotational speed but not enough to meet the target minimum rotational speed determined for the iteration, and the second target gear setting will increase the current rotational speed to at least the target minimum rotational speed for the iteration.

* * * * *